(12) United States Patent
Yokoi

(10) Patent No.: US 9,415,854 B2
(45) Date of Patent: Aug. 16, 2016

(54) AIRCRAFT WINDOW AND AIRCRAFT HAVING AN ELECTROMAGNETIC SHIELD

(71) Applicant: Mitsubishi Aircraft Corporation, Aichi (JP)

(72) Inventor: Takashi Yokoi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 133 days.

(21) Appl. No.: 14/323,654

(22) Filed: Jul. 3, 2014

(65) Prior Publication Data

US 2014/0319276 A1 Oct. 30, 2014

Related U.S. Application Data

(63) Continuation-in-part of application No. 13/560,388, filed on Jul. 27, 2012, now Pat. No. 8,998,140.

(30) Foreign Application Priority Data

Sep. 14, 2011 (JP) .................................. 2011-200692

(51) Int. Cl.
*B64C 1/14* (2006.01)
*B64D 45/00* (2006.01)

(52) U.S. Cl.
CPC .............. *B64C 1/1492* (2013.01); *B64D 45/00* (2013.01); *B64D 2045/006* (2013.01)

(58) Field of Classification Search
CPC .. B64C 1/1476; B64C 1/1484; B64C 1/1492; H05K 9/0005; H05K 9/0094
See application file for complete search history.

(56) References Cited

U.S. PATENT DOCUMENTS

| 3,592,479 A | 7/1971 | Andresen |
| 4,247,737 A * | 1/1981 | Johnson ................... H05K 9/00 174/389 |
| 4,780,575 A | 10/1988 | Flavin et al. |
| 4,793,108 A * | 12/1988 | Bain ..................... B64C 1/1492 52/208 |
| 4,823,229 A | 4/1989 | Waterland |
| 4,968,854 A | 11/1990 | Benn et al. |

(Continued)

FOREIGN PATENT DOCUMENTS

| EP | 0 303 349 A2 | 2/1989 |
| JP | 2003-523911 A | 8/2008 |
| WO | 00-66426 A1 | 4/2000 |

OTHER PUBLICATIONS

MIL-DTL-5541F, Chemical Conversion Coatings on Aluminum and Aluminum Alloys, Jul. 11, 2006. Accessed from https://www.wbdg.org/ccb/FEDMIL/dtl5541f.pdf on Jan. 4, 2016.*

(Continued)

*Primary Examiner* — Brian M O'Hara
*Assistant Examiner* — Alexander V Giczy
(74) *Attorney, Agent, or Firm* — Pearne & Gordon LLP

(57) ABSTRACT

A window body constituting a window of an aircraft includes an electromagnetic shield film, and a conductive paint is applied to an outer perimeter edge face of the window body. A fixing member secures the window body to an airframe with a gasket seal and a window frame interposed therebetween. The fixing member has a first bonding surface on which a conductive film is formed. The first bonding surface is in direct contact with the gasket seal. An electrical path is formed through the electromagnetic shield film, the conductive paint, the gasket seal, the fixing member, and the window frame.

20 Claims, 13 Drawing Sheets

(56) References Cited

U.S. PATENT DOCUMENTS

| | | | | |
|---|---|---|---|---|
| 5,012,041 A * | 4/1991 | Sims | | H05K 9/0005 |
| | | | | 174/381 |
| 5,045,635 A * | 9/1991 | Kaplo | | H02B 1/16 |
| | | | | 174/354 |
| 5,271,581 A * | 12/1993 | Irish | | B64C 1/1492 |
| | | | | 244/129.3 |
| 5,277,384 A | 1/1994 | Webb | | |
| 5,294,373 A | 3/1994 | Takahashi et al. | | |
| 5,524,908 A | 6/1996 | Reis | | |
| 5,698,316 A * | 12/1997 | Kuras | | B32B 3/266 |
| | | | | 244/1 A |
| 6,116,615 A * | 9/2000 | Trehan | | H05K 9/0015 |
| | | | | 174/358 |
| 6,787,221 B2 | 9/2004 | Botrie et al. | | |
| 7,118,070 B2 | 10/2006 | Abrams et al. | | |
| 7,913,385 B2 | 3/2011 | Carson et al. | | |
| 2002/0042162 A1* | 4/2002 | Tone | | B29C 70/885 |
| | | | | 438/118 |
| 2003/0087048 A1* | 5/2003 | Chaussade | | B64C 1/1492 |
| | | | | 428/34 |
| 2003/0234322 A1* | 12/2003 | Bladt | | B64C 1/1484 |
| | | | | 244/129.3 |
| 2004/0094906 A1 | 5/2004 | Gentemann et al. | | |
| 2005/0039936 A1 | 2/2005 | Hikita et al. | | |
| 2006/0270470 A1* | 11/2006 | de La Chapelle | | B64C 1/1492 |
| | | | | 455/575.5 |
| 2007/0137117 A1 | 6/2007 | Carlson et al. | | |
| 2007/0194177 A1* | 8/2007 | Coak | | B64C 1/1492 |
| | | | | 244/129.3 |
| 2008/0165516 A1* | 7/2008 | Pruss | | H05K 5/061 |
| | | | | 361/800 |
| 2008/0308677 A1 | 12/2008 | Kirchoff et al. | | |
| 2009/0303602 A1* | 12/2009 | Bright | | G02B 1/111 |
| | | | | 359/585 |
| 2010/0043300 A1* | 2/2010 | Krafn | | B64C 1/1492 |
| | | | | 49/483.1 |
| 2010/0044513 A1* | 2/2010 | Gallant | | B64C 1/1492 |
| | | | | 244/129.3 |
| 2010/0078897 A1 | 4/2010 | McPeek et al. | | |
| 2010/0230543 A1* | 9/2010 | Bruce | | B05B 15/0462 |
| | | | | 244/129.3 |
| 2012/0241559 A1* | 9/2012 | Ebner | | B64C 1/1492 |
| | | | | 244/129.3 |
| 2014/0097018 A1* | 4/2014 | Russell | | B64C 1/1492 |
| | | | | 174/389 |

OTHER PUBLICATIONS

European Search Report for Application 12178442.5-1254 dated Nov. 22, 2012.

Jie Zhang and Shengyu Feng, "Effect of Crosslinking on the Conductivity of Conductive Silicone Rubber," Journal of Applied Polymer Science, vol. 89, 3471-3475 (2003), Jan. 11, 2003.

* cited by examiner

AIRCRAFT WINDOW AND AIRCRAFT HAVING AN ELECTROMAGNETIC SHIELD

CROSS-REFERENCE TO RELATED APPLICATIONS

This application is a continuation in part of U.S. patent application Ser. No. 13/560,388 filed on Jul. 27, 2012 which is based on Japanese Patent Application No. 2011-200692 filed on Sep. 14, 2011. The contents of these applications are herein incorporated by reference in their entirety.

BACKGROUND OF THE INVENTION

1. Field of the Invention

The present invention relates to an aircraft window having an electromagnetic shield and an aircraft including the same.

2. Description of the Related Art

Aircraft have to be able to fly in safety without occurrence of a malfunction, an unforeseen behavior (up-set), or others in High Intensity Radiated Fields (HIRF), which represents an electro-magnetic environment from radio, television, radar, emitters, and other sources during cruising flight or during takeoff or landing. To this end, HIRF protection measures required in (14 CFR) sections 23.1308, 25.1317, 27.1317, and 29.1317 of High-intensity Radiated Fields (HIRF) protection, which stipulate regulations (airworthiness requirements) of Federal Aviation Administration (FAA), have to be taken.

The importance of protection of electric/electronic systems of aircraft has been significantly increasing in recent years for the following reasons:
1) a greater dependence on electric/electronic systems performing functions required for continued safe flight and landing of the aircraft;
2) a decrease in electromagnetic shielding by a composite material of some kind for use in designing aircraft;
3) an increase in susceptibility (sensitivity) to HIRF of electric/electronic systems accompanied by a higher speed of the operating speed of a data bus and a processor, a higher-density of an IC and a card, and a higher degree of sensitivity of electronic equipment;
4) an expansion of use frequency to a high-frequency band of, in particular, 1 GHz and higher;
5) an increase in severity of an HIRF environment with an increase in the number of RF transmitters and electric power; and
6) an adverse affect on part of aircraft when exposed to HIRF environment.

On the other hand, inside an aircraft, due to radio wave and electromagnetic noise (hereinafter simply referred to as electromagnetic noise) emitted from various electronic equipment, such as portable telephones, game machines, notebook-sized personal computers, and PEDs (Personal Electro Devices), such as an active-type RFID (Radio Frequency IDentification) tag attached to air freight cargo, an adverse effect can occur in, for example, communications with a control tower and communications and control of navigation for flight via a predetermined route. Thus, as well known, passengers are asked to refrain from using various electronic equipment inside aircraft.

Since the airframe of an aircraft is generally formed of metal, electromagnetic noise comes and goes from a cabin (a seat space) to a cockpit (a flight deck) and an avionics bay mainly through a cabin window and a cockpit window. Thus, in order to prevent electromagnetic noise that can be a hindrance from entering the cockpit and the avionics bay, a film made of ITO (Indium Tin Oxide), gold, silver, or the like is provided as being inserted to the cabin window made by laminating a plurality of window panels made of acrylic or the like (for example, refer to Japanese Patent Application Publication (Translation of PCT Application) No. 2003-523911).

On the other hand, in order to provide the electromagnetic shield, in a cabin window, a conductive film, which transmits light rays, has an electromagnetic shielding performance is held between window panels. Such the conductive film is composed of a film made of ITO, gold, silver, or the like; conductive fibers (Woven Mesh) plated with copper, nickel or the like; a printed mesh formed by printing an ink containing a conductive filler, such as silver on transparent PET (polyethylene terephthalate) or the like; or an expanded metal (mesh made of metal) made of a punched metal plate.

These conductive films to be used for preventing invasion of electromagnetic noise need to be electrically bonded (grounded) to the airframe in order to remove a radio frequency skin current (RF skin current) or charged static. The conductive films are secured onto a retainer mounting frame made of a conductive material, such as aluminum, along the outer perimeter part of the window with an air-tight gasket seal interposed therebetween, by using fixing members, such as clamps, clips or the like made of a conductive material (for example, refer to U.S. Patent Publication No. 2007/0137117 Specification, U.S. Patent Publication No. 2008/0308677 Specification and U.S. Pat. No. 7,913,385 Specification).

The cabin window is mainly formed by using a stretched acrylic material, and the gasket seal that is fitted to the entire perimeter of the window is made of an EPDM rubber (ethylene-propylene-diene rubber) or a silicone rubber for the purpose of providing an air-tight sealing property, so as to maintain the air pressure inside the cabin from a low pressure of the outside of the airframe and prevent outside rain and moisture from invading therein.

In this case, however, since the normal EPDM rubber and silicone rubber are non-conductive materials, they have no electromagnetic shielding effect. Therefore, electromagnetic waves make the gasket seal function as if it were an opening slot (an invading inlet for electric waves), and in the case of a high-frequency band with electric waves whose wavelength is a half (½ wavelength) or less, the electromagnetic waves, as they are, transmit through the gasket seal member, and invade into the airframe without being attenuated.

For this reason, a method has been proposed in which by mixing a conductive filler such as metal or the like with the gasket seal material so as to have a conductivity so that the conductive film and the retainer mounting frame are electrically connected to each other.

In Japanese Patent Application Publication (Translation of PCT Application) No. 2003-523911, U.S. Patent Publication No. 2007/0137117 Specification and U.S. Patent Publication No. 2008/0308677 Specification, a gasket seal made of a conductive rubber is used for the purpose of ensuring an electromagnetic shielding configuration. In Japanese Patent Application Publication (Translation of PCT Application) No. 2003-523911), U.S. Patent Publication No. 2007/0137117 Specification and U.S. Patent Publication No. 2008/0308677 Specification, to prevent galvanic corrosion due to bonded dissimilar metals in a metal window frame, an RF skin current is passed to the metal window frame from the gasket seal by capacitive coupling.

However, for the purpose of anticorrosion protection, an electric insulating treatment is applied to the surface of the window frame, made of metal (e.g., an aluminum alloy), by undercoating with an epoxy primer, etc. and coating with a topcoat, etc. in addition to an oxide film treatment by anodizing. Thus, it is difficult to pass the RF skin current or static to the airframe structure.

In addition to these, another countermeasure is proposed in which electrical bonding to the airframe structure is effected by using a bonding jumper or the like; however, this method causes demerits such as an increase in the number of parts, an increase in weight, and a time-consuming exchanging process of the bonding jumper required at the time of regular equipment inspections.

To effect electrical bonding at a low impedance, an exclusively-used bonding jumper needs to be added to each bonding position, resulting in high costs and/or an increase in weight.

Moreover, for example, in automobiles or various equipments, etc. of other fields, also, prevention of electromagnetic waves from invading from the outside has been required for an electromagnetic shielding window or a closing member that closes an opening, and may lead to the same problems as those described above in these parts.

The present invention is accomplished in view of these technical problems, and has an object of providing an aircraft window or the like that can pass a radio frequency skin current (RF skin current) or charged static to an airframe structure side while preventing electromagnetic noise by an electromagnetic shielding window and a conductive gasket seal more reliably than ever before.

SUMMARY OF THE INVENTION

For that object, the present invention provides a window of an aircraft to be attached to an opening formed in an airframe of the aircraft, the window includes: a window body; a window frame that is made of a conductive material and surrounds an outer perimeter part of the window body; a gasket seal that is made of a conductive rubber material, at least a portion of the gasket seal being held between the outer perimeter part of the window body and the window frame; and a fixing member that is made of a conductive material and secures the window body to the airframe with the gasket seal and the window frame interposed therebetween. The window body includes a window panel having light transmissibility, and an electromagnetic shield film that is made of a conductive material and laminated on the window panel. A conductive paint is applied to an outer perimeter edge face of the window body. The fixing member has a first bonding surface in direct contact with the gasket seal. A conductive film is formed on the first bonding surface of the fixing member. In the aircraft window of the present invention, an electrical path is formed through the electromagnetic shield film, the conductive paint, the gasket seal, the fixing member, and the window frame. The conductive paint is applied to the outer perimeter edge face of the window body, and the conductive film is formed on the bonding surface of the fixing member with the gasket seal. That is, the fixing member supposed to secure the window body also functions as an element effecting electrical bonding. Therefore, the aircraft window of the present invention can be electrically bonded to the airframe structure at a low impedance (a low direct current resistance). Accordingly, as compared to the case in which capacitive coupling is used, an RF skin current or charged static can be more reliably passed to the airframe metal structure side.

Examples of the fixing member of the present invention include a clamp and a clip made of metal such as an aluminum alloy.

There are two types of conductive paints: a wet-type conductive paint and a dry-type conductive paint. Since the dry-type conductive paint has excellent maintainability for exchange of the window, the dry-type conductive paint is suitable for the application in which the conductive paint is applied to the outer perimeter edge face of the window body. On the other hand, the wet-type conductive paint, such as a conductive sealant, is not so suitable for the application.

According to the present invention, the RF skin current or charged static can be more reliably passed to the airframe structure side while preventing electromagnetic noise by the electromagnetic shielding window and the conductive gasket seal more reliably than ever before. Therefore, it is possible to prevent invasion of electromagnetic noise into the airframe and electro static discharge.

Moreover, according to the present invention, the electromagnetic noise preventing effect, and the electro static discharge suppressing effect can be easily obtained at low cost without causing an increase in weight.

DETAILED DESCRIPTION OF THE PREFERRED EMBODIMENTS

The present invention is described in detail below based upon preferred embodiments shown in attached drawings.

Figure 1:
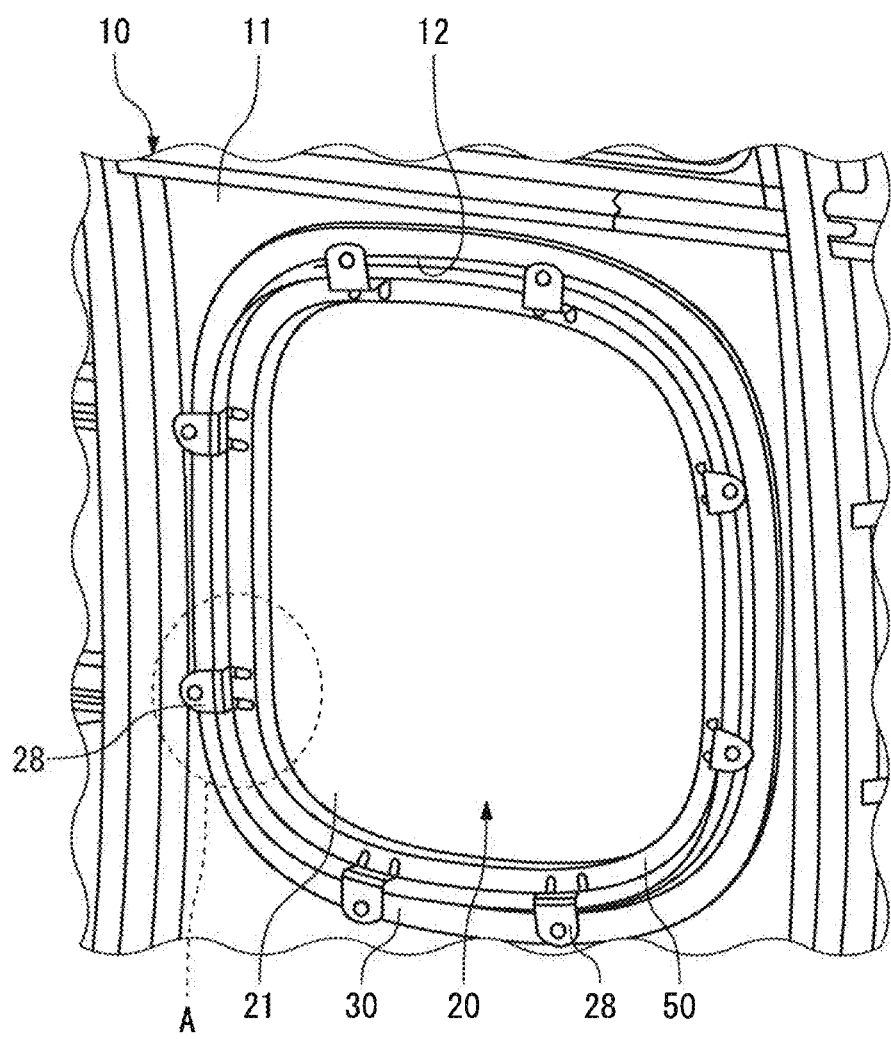
FIG. 1 is a perspective view illustrating an aircraft window in accordance with the present embodiment.

FIG. 1 is a view that explains the structure of a cabin window 20 (window, closing member body) of an aircraft 10 in accordance with the present embodiment.

As shown in FIG. 1, the cabin window 20 is provided on the side face of an airframe of the aircraft 10. The cabin window 20 is attached to an opening 12 formed on a skin 11 made of a conductive material forming the airframe of the aircraft 10. The cabin window 20 includes a window body 21 and a window frame 30 that surrounds the entire perimeter part of the window body 21.

Figure 2A:
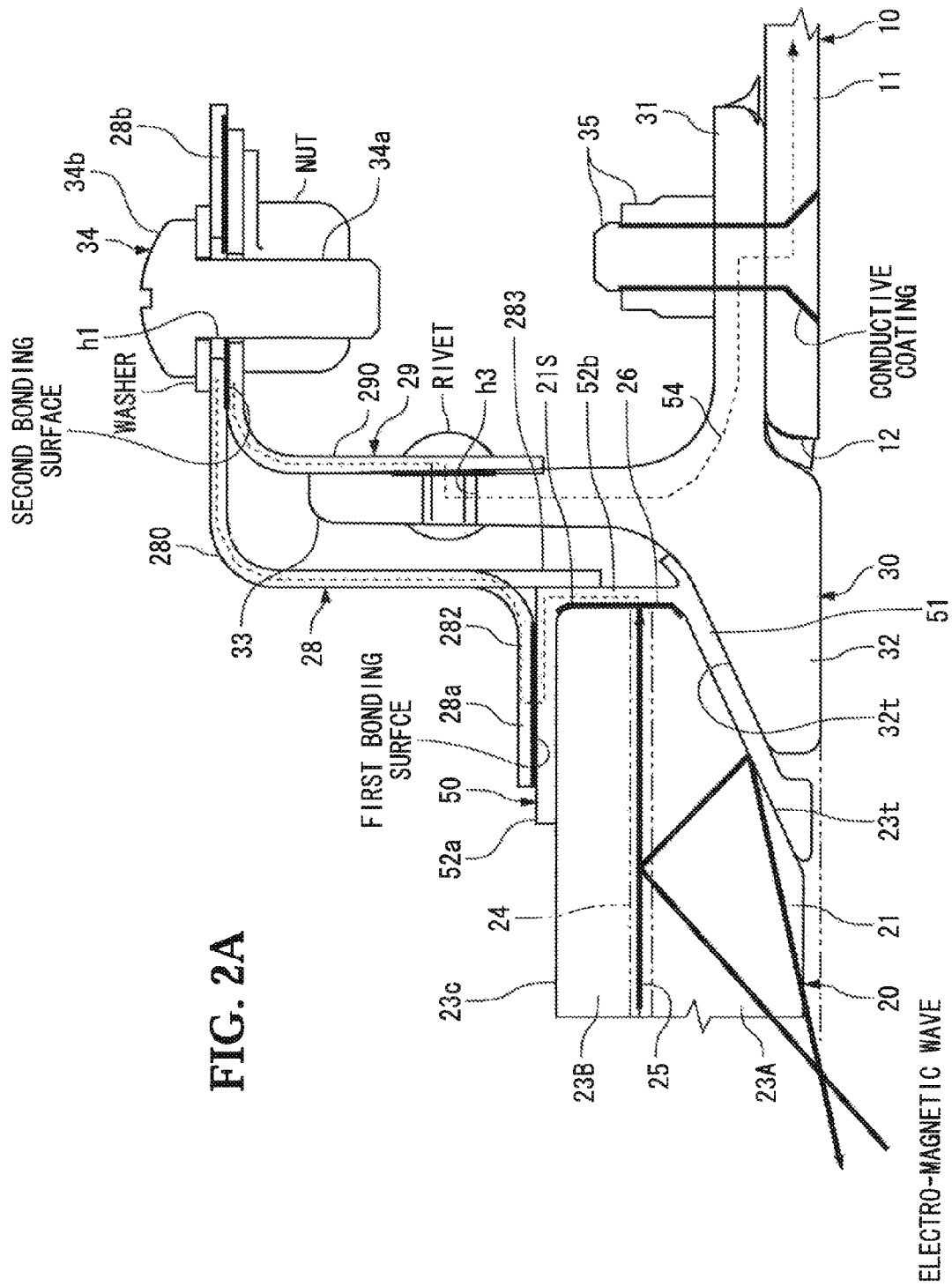
FIG. 2A is a cross-sectional view illustrating the aircraft window and FIG. 2B is a cross-sectional view illustrating a gasket seal.

As shown in FIG. 2A, the window body 21 is configured by laminating a plurality of, two in the present embodiment, window panels (closing member panels) 23A and 23B made of stretched acrylic plates. Here, in the present embodiment, the cabin window 20 has a laminated type structure in which all the window panels 23A and 23B are made of stretched acrylic plates, with a resin film 24, made of polyurethane or the like for use in lamination, being held between the window panels 23A and 23B. In addition to this type, another air-gap-type structure is proposed in which an air layer is placed between the two window panels 23A and 23B.

In this case, the window panel 23A on the outside of the airframe has a tapered portion 23t, formed on the perimeter part thereof, that is gradually narrowed from the outside of the airframe toward the inside thereof.

Between the window panel 23A and the resin film 24, an electromagnetic shield mesh (electromagnetic shield film) 25, made of polyester fibers plated with copper (Cu), black nickel (Ni) or the like for use in electromagnetic shielding, is formed. As the electromagnetic shield film, in place of the electromagnetic shield mesh 25, a printed mesh, an expanded metal member made of metal, or a conductive shield thin film made of a conductive material such as ITO, gold, silver, or the like, may also be used.

The electromagnetic shield mesh 25 held by the window panels 23A and 23B has an area equivalent to the window panels 23A and 23B, with its perimeter part exposed to the perimeter part of the window body 21.

A conductive paint 26 is applied onto the entire perimeter of the outer perimeter edge face 21s of the window body 21. With this structure, the electromagnetic shield mesh 25, held by the window panels 23A and 23B, and the conductive paint 26 are electrically connected to each other. Moreover, the conductive paint 26 is designed so as to prevent moisture from invading between the laminated window panels 23A and 23B. As described above, a dry-type conductive paint is preferably employed as the conductive paint 26 to be applied onto the outer perimeter edge face 21s of the window body 21.

The window frame 30 is made of a conductive material such as an aluminum alloy. The window frame 30 includes a fastener plate part 31 that abuts against the inner side of the skin 11, a window panel holding part 32 that is located in an opening formed on the skin 11, and faces the tapered portion 23t of the window body 21, and an edge wall part 33 that extends from the window panel holding part 32 toward the inside of the airframe.

The window frame 30 is fastened to the skin 11 by a number of bolts&nuts (fasteners) 35 made of a conductive material in the fastener plate part 31, and is electrically connected to the skin 11 through the bolts&nuts 35.

Figure 3:
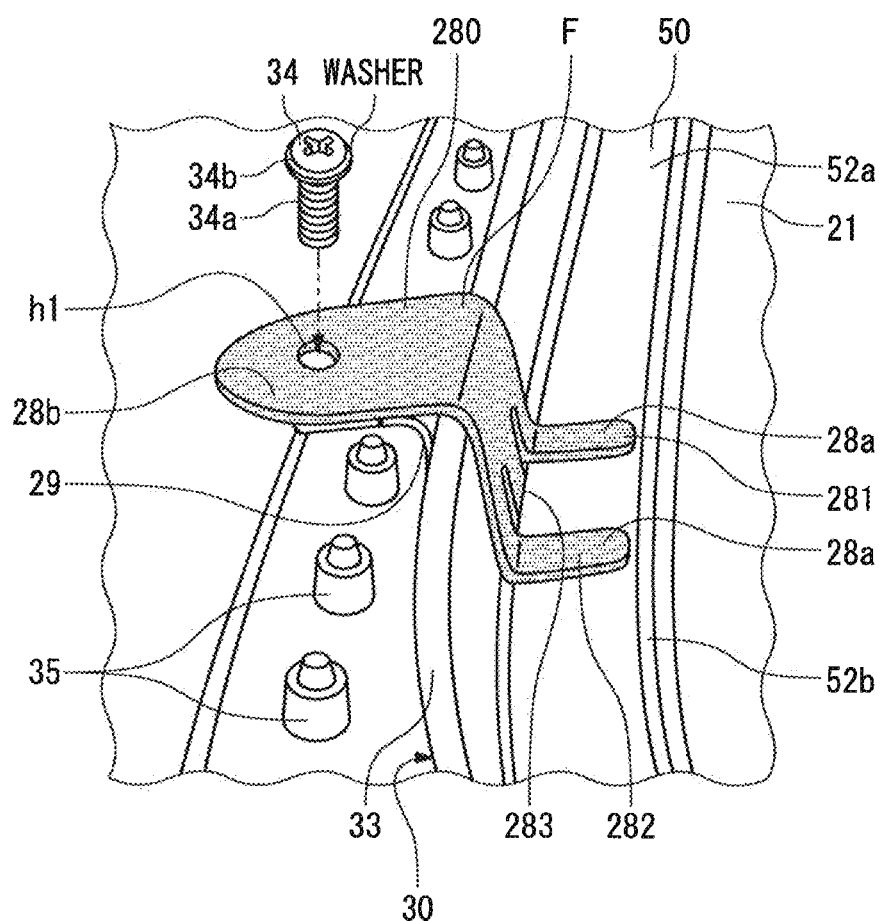
FIG. 3 is a perspective view illustrating a portion surrounded by a dotted line A in FIG. 1.

Although the bolts&nuts 35 are not shown in FIG. 1, a number of bolts&nuts 35 are provided at an even interval in the fastener plate part 31 as shown in FIGS. 2A and 3. The bolts&nuts are made of metal, and the bolts preferably have a conductive coating on their surfaces.

The window panel holding part 32 includes a tapered surface 32t, which faces the inside of the airframe, and is gradually narrowed from the inside of the airframe toward the outside of the airframe. The tapered surface 32t extends substantially parallel to the tapered portion 23t of the window body 21.

Between the outer perimeter part of the window panels 23A and 23B and the window frame 30, a gasket seal 50, made of a conductive silicon rubber material, is provided. The gasket seal 50 is formed into a ring shape so as to surround the entire perimeter of the outer perimeter part of the window panels 23A and 23B.

Figure 2B:
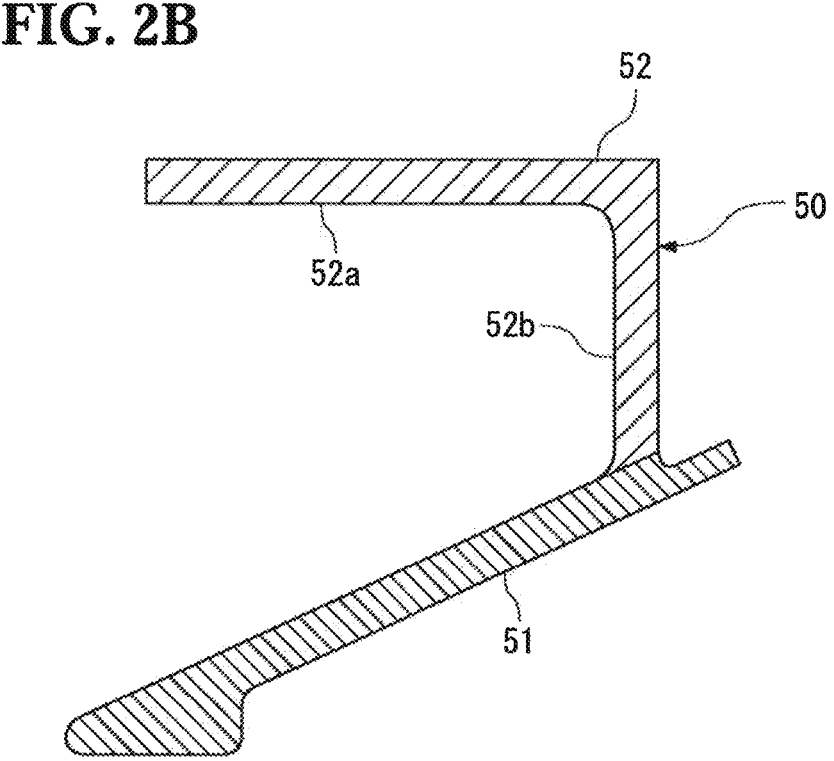

As shown in FIGS. 2A and 2B, the gasket seal 50 includes a first seal part 51 that abuts against the window frame 30, and a second seal part 52 that is placed along the window body 21 inside the airframe.

One surface of the first seal part 51 is formed along the tapered portion 23t of the window panel 23A, and the other surface thereof is formed so as to abut against the tapered surface 32t of the window panel holding part 32.

Moreover, the second seal part 52 has a structure having an L-letter shape in its cross section which is formed by an edge part 52a placed along the airframe inside surface 23c of the window panel 23B and an outer frame part 52b placed along the outer perimeter edge face 21s of the window body 21. In this case, the outer frame part 52b is provided so as to be tightly made in contact with the portion on the outer perimeter edge face 21s of the window body 21 to which the conductive paint 26 is applied.

These first seal part 51 and second seal part 52 are made of conductive rubber materials having mutually different volume resistivities.

The first seal part 51 is made of a first conductive rubber material having a lower volume resistivity than that of the second seal part 52, and the second seal part 52 is made of a second conductive rubber material having a higher volume resistivity than that of the first seal part 51. More specifically, the first seal part 51 is made of a first conductive silicone rubber material having, for example, a volume resistivity of $10^{-3}$ to 5 Ωcm. On the other hand, the second seal part 52 is made of a second conductive silicone rubber material having, for example, a volume resistivity of 300 to $10^8$ Ωcm. As the materials for these conductive silicone rubber materials, for example, conductive silicone rubber including a conductive filler may be used. In order to allow the first seal part 51 and second seal part 52 to have mutually different volume resistivities, mixing ratios of fillers made of conductive materials to be mixed into a silicone rubber material forming a base material, can be made different. The examples of the conductive materials for the fillers are Ag, Ag/Cu, Ag/Al, Ni/Cu, Ni/Al, C, Ag/C, Ni/C, etc.

Moreover, these first seal part 51 and second seal part 52 are subjected to a curing treatment through thermosetting so that silicone rubbers are polymer-bonded into an integral structure with intermolecular bonding in which they are not separated from each other.

In the present specification, terms such as "Ag/Cu" have the following meanings.

Ag/Cu: a filler in which outer surfaces of copper particles are silver-plated.

Ag/Al: a filler in which outer surfaces of aluminum particles are silver-plated.

Ni/Cu: a filler in which outer surfaces of copper particles are nickel-plated.

Ni/Al: a filler in which outer surfaces of aluminum particles are nickel-plated.

Ag/C: a filler in which outer surfaces of graphite carbon particles are silver-plated.

Ni/C: a filler in which outer surfaces of graphite carbon particles are nickel-plated.

By this gasket seal 50, the electromagnetic shield mesh 25, held between the window panels 23A and 23B, is electrically connected to the second seal part 52 through the conductive paint 26.

The second seal part 52 of the gasket seal 50 is pushed onto the window panel 23B by one end 28a of a clamp (fixing member) 28 having a crank shape that is formed on the rear side of the gasket seal 50. The other end 28b of the clamp 28 is coupled to the edge wall part 33 of the window frame 30 through a clip (fixing member) 29 having an L-letter shape in its cross section. The clamp 28 may be a first member of the fixing member and the clip 29 may be a second member of a fixing member. In this case, in the same manner as in the window frame 30, the clamp 28 and the clip 29 are made of a conductive material such as an aluminum alloy, and are electrically connected to the window frame 30.

Thus, the electromagnetic shield mesh 25 is electrically connected to the window frame 30 through the conductive paint 26, the second seal part 52, the clamp 28 and the clip 29.

Additionally, the grounded point by the clamp 28 is assumed to be a minimum point; however, the clamp 28 may have a structure that is continuously placed along the entire perimeter of the gasket seal 50 so as to improve its shielding performance.

Although eight clamps 28 are shown in FIG. 1, the number of the clamps 28 is appropriately increased or decreased based on the dimensions of the opening 12 formed on the skin 11. As shown in FIG. 2A, since the clip 29 is tightened together with the clamp 28 by a screw 34, the number of the clips 29 matches the number of the clamps 28.

To prevent galvanic corrosion due to bonded dissimilar metals, the clamp 28 and the clip 29 in contact with each other are preferably made of the same material. The clip 29 and the window frame 30 in contact with the clip 29 are also preferably made of the same material.

If the window frame 30 is made of an aluminum alloy, and the clip 29 in contact with the window frame 30 is made of another material, it is necessary to separately take a countermeasure for alleviating the galvanic corrosion due to the bonded state of dissimilar metals. As the countermeasure, a method is proposed in which the bonding surface of the window frame 30 is plated with a material, for example, nickel (Ni), tin (TIN) or chromate in order to avoid the anodic index or potential difference. However, high costs are required for the pretreatment (polishing) of the plating, masking treatments, plating processes, and the like. Another method may be proposed in which the aluminum alloy material is changed to corrosion resistance steel (CRES); however, for use in aircrafts, this method causes more demerits such as heavy weight.

The preferable shape of the clamp 28 is described hereinafter with reference to FIGS. 3 and 2A.

As shown in FIG. 3, the clamp 28 includes a base part 280 having an L-letter shape in its cross section, and a first leg part 281, a second leg part 282, and a third leg part 283 that are formed at the end of the base part 280. A though hole h1, into which a shank part 34a of the screw 34 is inserted, is formed in the base part 280. In the following, the side where a head part 34b of the screw 34 is located is called a first surface F (a front side) of the clamp 28, and the side where the shank part 34a of the screw 34 is located is called a second surface S (a rear side) of the clamp 28.

The third leg part 283 is located between the first leg part 281 and the second leg part 282, and extends, without being bent, from the end of the base part 280. As shown in FIG. 2A, the third leg part 283 is long enough that its distal end reaches the second seal part 52 (the outer frame part 52b) of the gasket seal 50. The first leg part 281 and the second leg part 282 have substantially the same shape, and substantially the same dimensions. The first leg part 281 and the second leg part 282 have an L-letter shape in their cross section as shown in FIG. 3, and are long enough that their ends reach the second seal part 52 (the edge part 52a) of the gasket seal 50.

The clamp 28 has a crank shape as a whole. The base part 280, the first leg part 281, the second leg part 282, and the third leg part 283 are integrally formed.

Next, an anticorrosion surface treatment and a conductive film formation treatment to be applied to the clamp 28 are described with reference to FIGS. 4 and 5.

Figure 4:
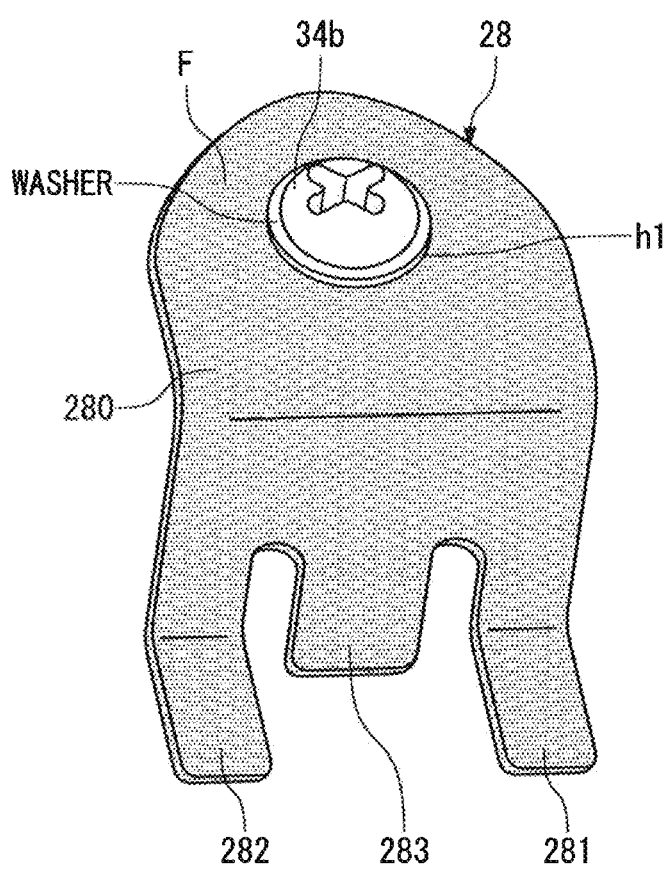
FIG. 4 is a perspective view of a first surface of a clamp as viewed from an angle different from that of FIG. 3.

FIG. 4 is a perspective view of the first surface F of the clamp 28 as viewed from an angle different from that of FIG. 3. FIG. 5 is a perspective view illustrating the second surface S of the clamp 28 on an opposite side of the clamp 28 from the first surface F. In FIGS. 4 and 5, dots are given to a portion where an anticorrosion surface treatment is applied.

As shown in FIG. 4, an anticorrosion surface treatment is applied to the first surface F of the clamp 28. In some examples, the anticorrosion surface treatment includes an anodizing treatment and application of an epoxy primer. To be more specific, preferably, the anodizing treatment is first performed on the first surface F of the clamp 28, and the epoxy primer is then applied thereto. The anticorrosion surface treatment is preferably homogeneously performed on the entire first surface F of the clamp 28.

Figure 5:
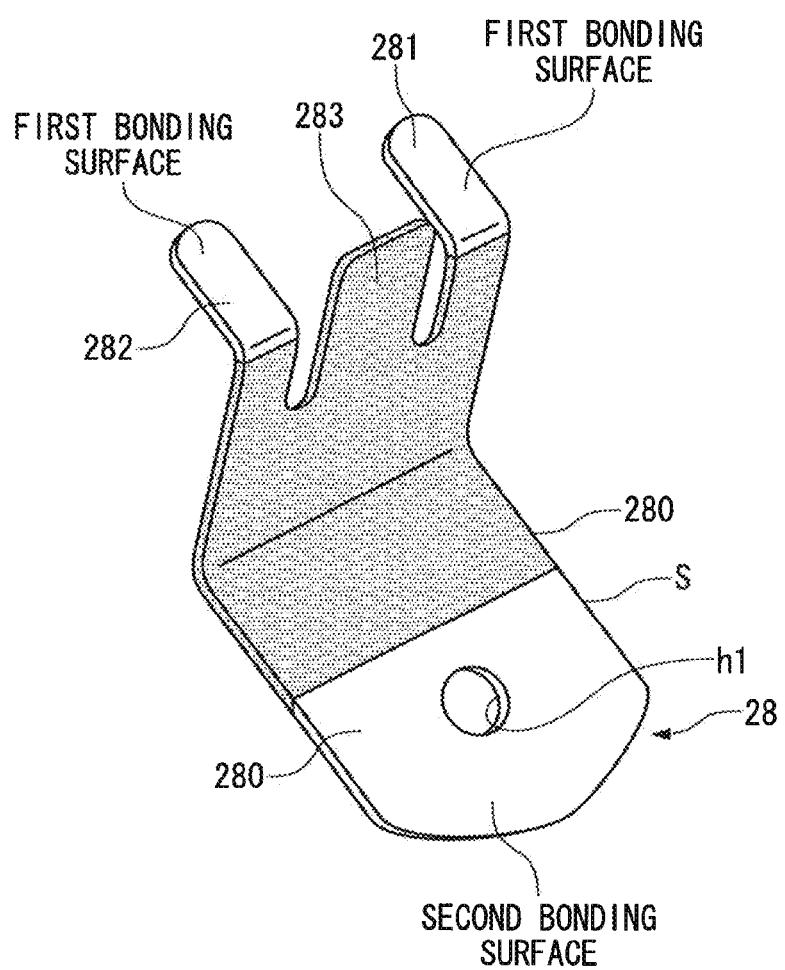
FIG. 5 is a perspective view illustrating a second surface of the clamp.

As shown in FIG. 5, an anticorrosion surface treatment such as a chemical conversion treatment is applied to only a portion of the second surface S of the clamp 28. Moreover, a conductive film formation treatment is applied to a portion in direct contact with the gasket seal 50 in the first leg part 281 and the second leg part 282. Similarly, a conductive film is formed on a portion of the base part 280, the portion being in contact with the clip 29. As discussed below, when the clamp 28 is made of an aluminum alloy, a chemical conversion coating film is preferably employed as the conductive film. A first bonding surface is formed on a portion in direct contact with the gasket seal 50 in the first leg part 281 and the second leg part 282. A second bonding surface is formed on a portion in direct contact with the clip 29 in the base part 280.

The cabin window 20 in the present embodiment is featured in that an electrical path is formed through the electromagnetic shield mesh (electromagnetic shield film) 25, the conductive paint 26, the gasket seal 50, the clamp 28, the clip 29, and the window frame 30. The conductive film formation treatment is applied to the first bonding surface and the second bonding surface of the clamp 28 so as to form the electrical path.

When the clamp 28 is made of an aluminum alloy, a chemical conversion coating film is preferably employed as the conductive film. The chemical conversion coating film has a property that its electrical resistance is quite small in addition to a property that its corrosion resistance is excellent. Therefore, by forming the chemical conversion coating films on the first bonding surface and the second bonding surface of the clamp 28, electrical conductivity between the gasket seal 50 and the clamp 28 and between the clamp 28 and the clip 29 is improved. The above electrical path 54 can be thereby effectively formed.

A chromate film is preferably employed as the chemical conversion coating film. In particular, ALODINE or IRIDITE are preferable.

Figure 6:
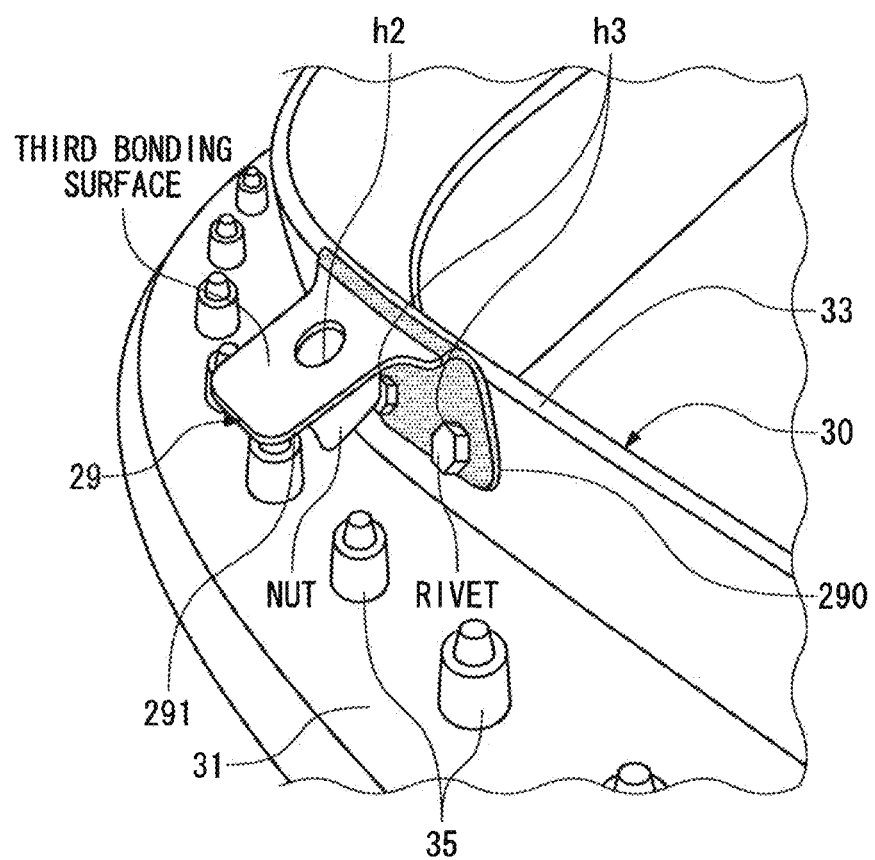
FIG. 6 is a perspective view illustrating a second surface of a clip.
Figure 7:
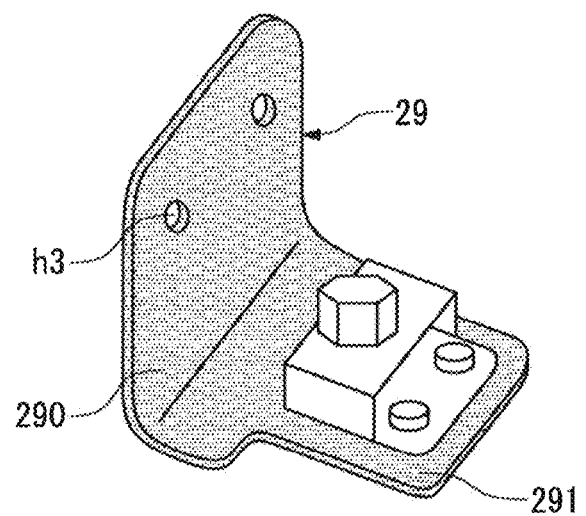
FIG. 7 is a perspective view illustrating a first surface of the clip.

Next, the shape of the clip 29, and an anticorrosion surface treatment and a conductive film formation treatment to be applied to the clip 29 are described with reference to FIGS. 6 and 7.

The clip 29 has an L-letter shape in its cross section. The clip 29 includes a base part 290, and an extension part 291 that extends substantially perpendicularly from the base part 290. Two through holes h3, into which a rivet (e.g., a solid rivet) made of a conductive material such as an aluminum alloy is inserted, are formed in the base part 290. The clip 29 is secured to the edge wall part 33 of the window frame 30 by the rivet. Electrical bonding between the clip 29 and the window frame 30 is thereby effected.

When the base part 290 of the clip 29 is coupled to the edge wall part 33 of the window frame 30, the extension part 291 is located substantially parallel to the fastener plate part 31 of the window frame 30.

The extension part 291 has a third bonding surface in direct contact with the second bonding surface of the clamp 28. A conductive film is formed on the third bonding surface. As described above, the clip 29 is preferably made of the same conductive material, e.g., an aluminum alloy, as the clamp 28. When the clip 29 is made of an aluminum alloy, a chemical conversion coating film such as a chromate film is preferably employed as the conductive film.

The clamp 28 and the clip 29 are coupled together after forming the chemical conversion coating films on the second bonding surface of the clamp 28 and the third bonding surface of the clip 29. Electrical conductivity between the clamp 28 and the clip 29 is thereby improved. As shown in FIG. 2A, the conductive film is also preferably formed on a portion in contact with the edge wall part 33 of the window frame 30 and around the through holes h3 in the base part 290 of the clip 29. Similarly, the conductive film is also preferably formed on a portion in contact with the base part 290 of the clip 29 and in the vicinity of a portion where the rivet is arranged in the edge wall part 33 of the window frame 30. Electrical conductivity among the clip 29, the rivet, and the window frame 30 is thereby improved. Accordingly, the above electrical path 54 can be effectively formed.

As described above, the electromagnetic shield mesh 25 of the window body 21 is electrically grounded to the window frame 30 through the conductive paint 26, the gasket seal 50, the clamp 28, and the clip 29 on the outer perimeter side of the window panels 23A and 23B. By electrically bonding (grounding) the end of the electromagnetic shield mesh 25 to the window frame 30 at a low impedance (a low direct current resistance), an RF skin current flowing through the electromagnetic shield mesh 25 can be actively passed to the airframe structure. That is, the RF skin current is passed to the airframe structure along a route specifically indicated by a dotted line in FIG. 2A. Thus, the cabin window 20 of the present embodiment can prevent electromagnetic noise from invading into the airframe.

Static may be charged in the electromagnetic shield mesh 25 by P-Static (precipitation static) produced by friction on the outer side of the window body 21. The static is passed to the airframe structure along the route specifically indicated by the dotted line in FIG. 2A and thereby removed. Therefore, the cabin window 20 of the present embodiment can prevent electro static discharge.

The route along which the RF skin current and the static flow is as follows:
the electromagnetic shield mesh 25→the conductive paint 26→the second seal part 52 of the gasket seal 50→the clamp 28→the clip 29→the rivet→the window frame 30→the bolts&nuts (fasteners) 35→the skin 11.

Electrical bonding resistances of the first bonding surface, the second bonding surface, and the third bonding surface are preferably smaller than 2.5 m$\Omega$, respectively. By setting the electrical bonding resistances of the respective bonding surfaces to be smaller than 2.5 m$\Omega$, a low impedance is ensured, and the electrical path 54 serving as the static removal route or the like can be positively formed.

In accordance with the above-mentioned structure, the electromagnetic shield mesh 25 is provided on the window body 21, and a gasket seal 50 made of a conductive rubber material is installed between the electromagnetic shield mesh 25 and the window frame 30 made of a conductive material. With this structure, since a film made of the conductive material can be formed between the window body 21 and the window frame 30, without any electrical gap, it becomes possible to positively prevent electromagnetic noise from invading into the cabin. In this case, the first seal part 51 of the gasket seal 50, interposed between the window body 21 and the window frame 30 on the airframe outside, has a low volume resistivity so that it becomes possible to positively prevent electromagnetic noise from invading into the airframe between the window body 21 and the window frame 30. When the window frame 30 is made of an aluminum alloy, corrosion may be caused between the first seal part 51 of the gasket seal 50 and the window frame 30. However, since the first seal part 51 does not serve as the static removal path as indicated by the dotted line in FIG. 2A, it is not very necessary to consider the corrosion.

Moreover, the electromagnetic shield mesh 25 of the window body 21 is electrically grounded to the window frame 30 through the conductive paint 26, the second seal part 52 of the gasket seal 50, the clamp 28 and the clip 29 on the outer perimeter side of the window panels 23A and 23B. In this case, since the second seal part 52 has a high volume resistivity, it is possible to suppress generation of corrosion in the contact portions to the clamp 28.

Since the second seal part 52 of the gasket seal 50 serves as the static removal path, it is necessary to avoid corrosion. To this end, a material having the same potential as that of the conductive material forming the clamp 28 is selected as the conductive rubber material forming the second seal part 52. When the clamp 28 is made of an aluminum alloy, a silicon rubber having a relatively high volume resistivity and the same potential as the aluminum alloy is used for the second seal part 52. Accordingly, corrosion between the clamp 28 and the second seal part 52 can be prevented even when a special treatment such as a plating treatment is not performed. Since the electromagnetic shield mesh 25 exists between the window panels 23A and 23B, there occurs no problem even when the volume resistivity of the second seal part 52 is made higher than that of the first seal part 51, and the electromagnetic shielding performance of the second seal part 52 is slightly lower than that of the first seal part 51.

Example 1

Examinations were carried out on the electromagnetic wave attenuation effect, with the volume resistivity of the gasket seal being changed. A gasket seal as shown in FIGS. 2A and 2B was provided on the outer perimeter of each of two acrylic plates having thicknesses t1=9.5 mm and t2=4 mm, and an external dimension of 248 mm×348 mm, and electromagnetic shielding effectiveness tests were carried out in accordance with IEEE STD-299-2006 "IEEE Standard Method for Measuring the Effectiveness of Electromagnetic Shielding Enclosures". In this case, in addition to a gasket seal of a reference having no conductivity, gasket seals having a volume resistivity of 1.7 $\Omega$cm (Measurement 1), that of 5 $\Omega$cm (Measurement 2), that of 210 $\Omega$cm (Measurement 3), and that of 310 $\Omega$cm (Measurement 4) were prepared. Moreover, as the acrylic plate, except for comparative examples, shield mesh materials composed of polyester fibers of monofilaments copper-plated and black nickel-plated with a surface resistivity of 0.15 $\Omega$/square were stacked and subjected to the tests.

Figure 8A:
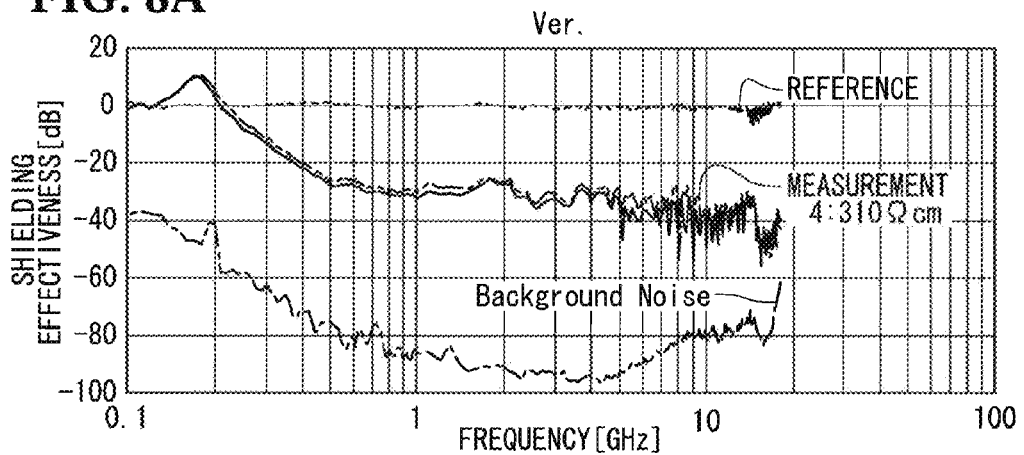
FIGS. 8A to 8C are graphs showing an electromagnetic-shield attenuation effect in the case when the volume resistivity of the gasket seal is changed.
Figure 8B:
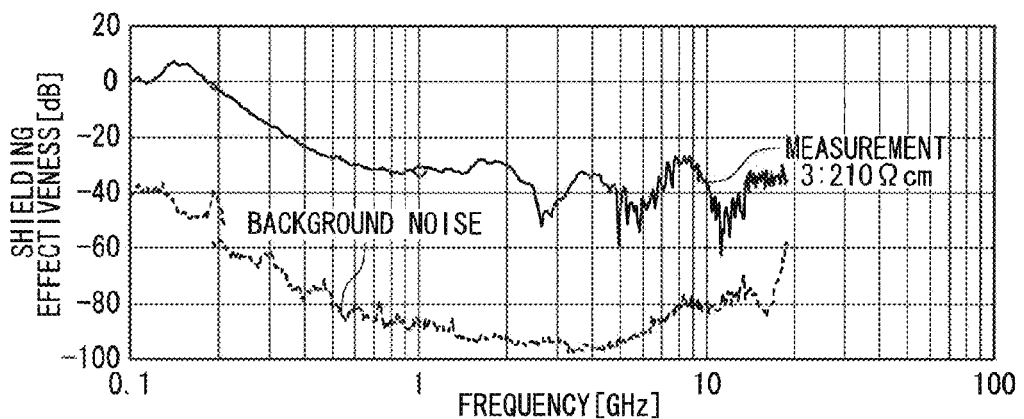
Figure 8C:
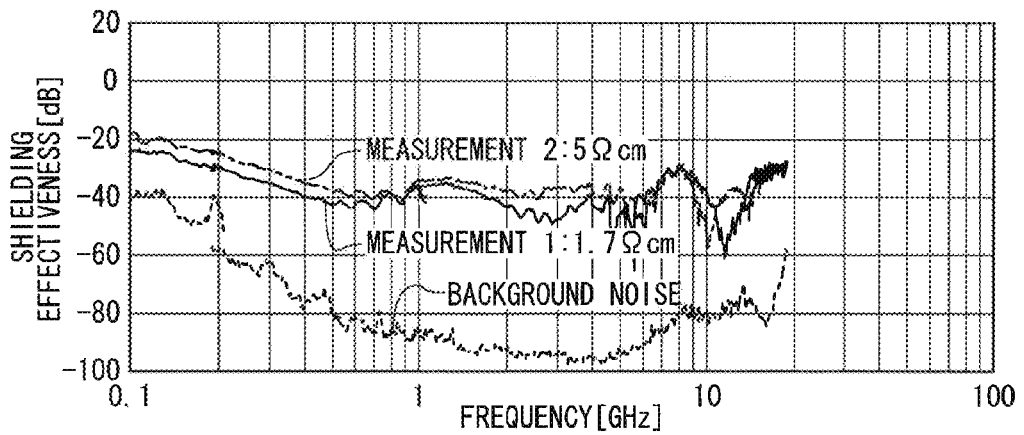

As a result, as shown in FIGS. 8A to 8C, although the attenuation effect was exerted even in Measurements 3 and 4 having high volume resistivity, the attenuation effect was small in a low frequency band. In contrast, in the case when the volume resistivity of the gasket seal was set to 5 $\Omega$cm or less, as in the case of Measurements 1 and 2, an attenuation effect of at least 20 dB or more against electromagnetic waves was obtained over the entire frequency bands from 100 MHz to 18 GHz.

Figure 9A:
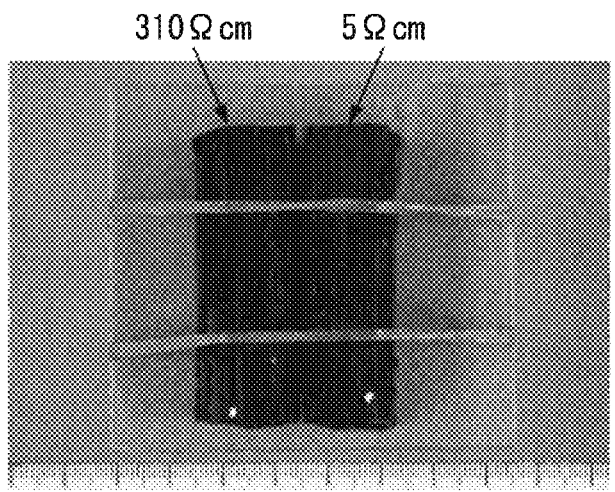
FIG. 9A is a view showing a method of a salt-spray test and FIG. 9B is a view showing the results thereof.

Moreover, with respect to the structures having 5 Ωcm and 310 Ωcm in the volume resistivity of the gasket seal, salt-spray tests were carried out so as to confirm the generation of corrosion. In this test, test pieces of gasket seals having 5 Ωcm and 310 Ωcm in volume resistivity were secured onto a plate made of A2024 aluminum alloy that had been subjected to an ALODINE treatment (FIG. 9A), and onto this, salt water was sprayed over 500 hours. Moreover, 168 hours after the completion of the spraying process, the presence or absence of corrosion on the aluminum plate was confirmed.

Figure 9B:
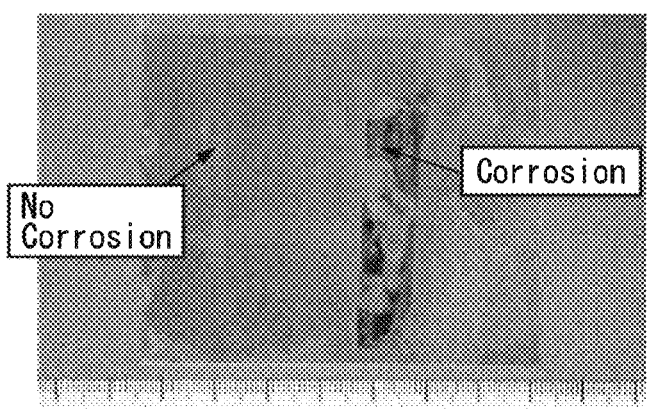

As a result, as shown in FIG. 9B, a portion with which the test piece having 5 Ωcm in volume resistivity was made in contact had a galvanic corrosion; however, no galvanic corrosion occurred at a portion with which the test piece having 310 Ωcm in volume resistivity was made in contact.

As long as the gasket seal has a volume resistivity of 300 Ωcm or more, even in the case when a bonding surface is formed as a portion to which a cabin window is secured, by carrying out a chemical conversion coating process (MIL-DTL-5541 Class 3, MIL-DTL-81706 Class 3) on the surface of an aluminum having electrical conductivity, it is possible to prevent galvanic corrosion from occurring even under moistened, humid or salt-water spraying environment because the conductive rubber material having a high resistivity is used.

Example 2

Next, examinations were carried out on the electromagnetic wave attenuation effect, with the electromagnetic shield mesh 25 being electrically bonded at a low impedance.

The electromagnetic shield mesh 25 as shown in FIG. 2A was arranged between two acrylic plates having thicknesses t1=8.1 mm and t2=4.6 mm, and an external dimension of 399 mm×327 mm, and electromagnetic shielding effectiveness tests were carried out in accordance with IEEE STD-299-2006 "IEEE Standard Method for Measuring the Effectiveness of Electromagnetic Shielding Enclosures". A shield mesh obtained by stacking shield mesh materials composed of polyester fibers of monofilaments copper-plated and black nickel-plated with a surface resistivity of 0.15 Ω/square was used as the electromagnetic shield mesh 25.

Figure 10A:
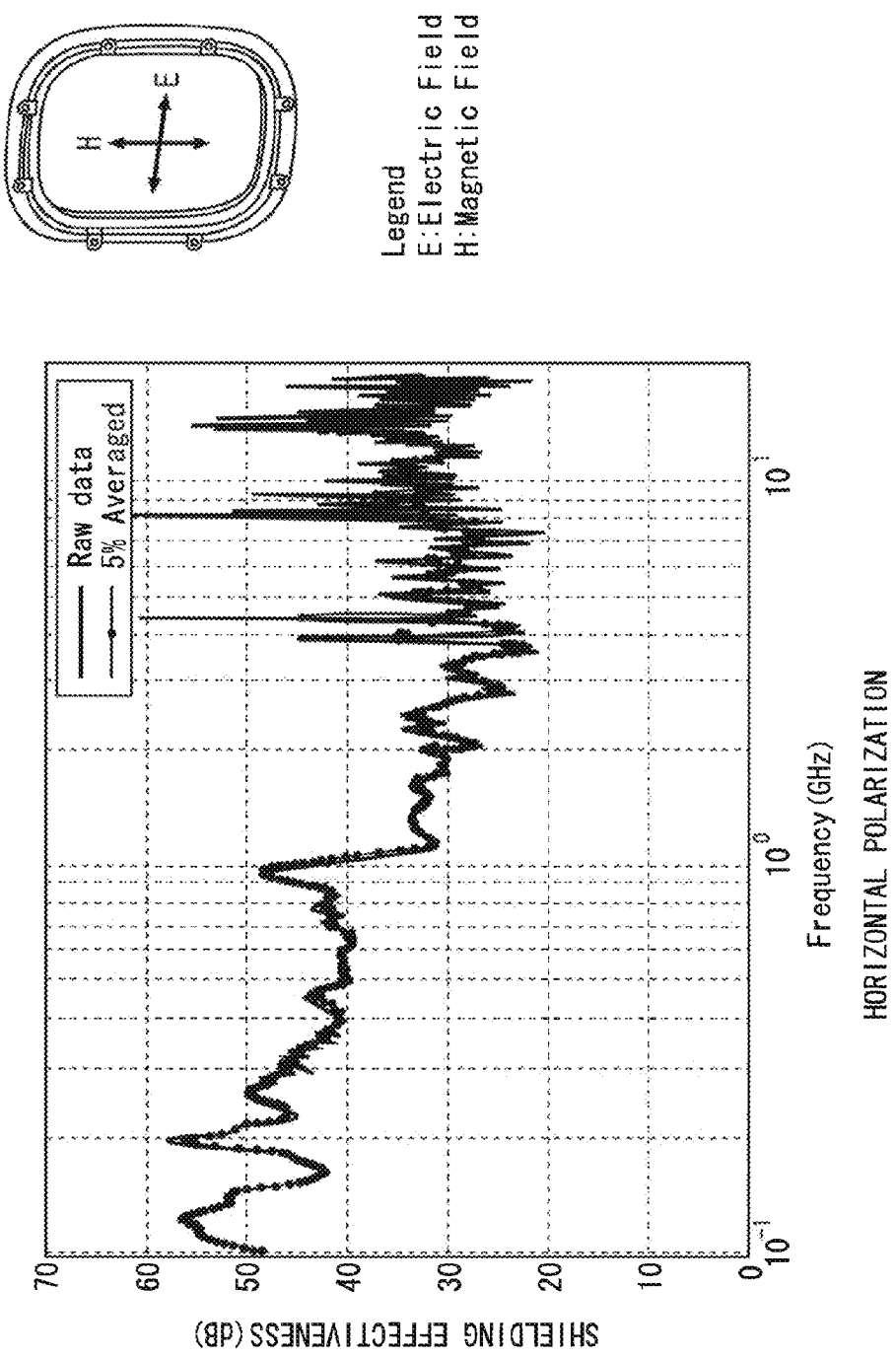
FIG. 10A is a graph showing an electromagnetic-shield attenuation effect (a horizontally polarized wave) in the case when an electromagnetic shield mesh is electrically bonded at a low impedance and FIG. 10B is a graph showing an electromagnetic-shield attenuation effect (a vertically polarized wave) in the case when an electromagnetic shield mesh is electrically bonded at a low impedance.
Figure 10B:
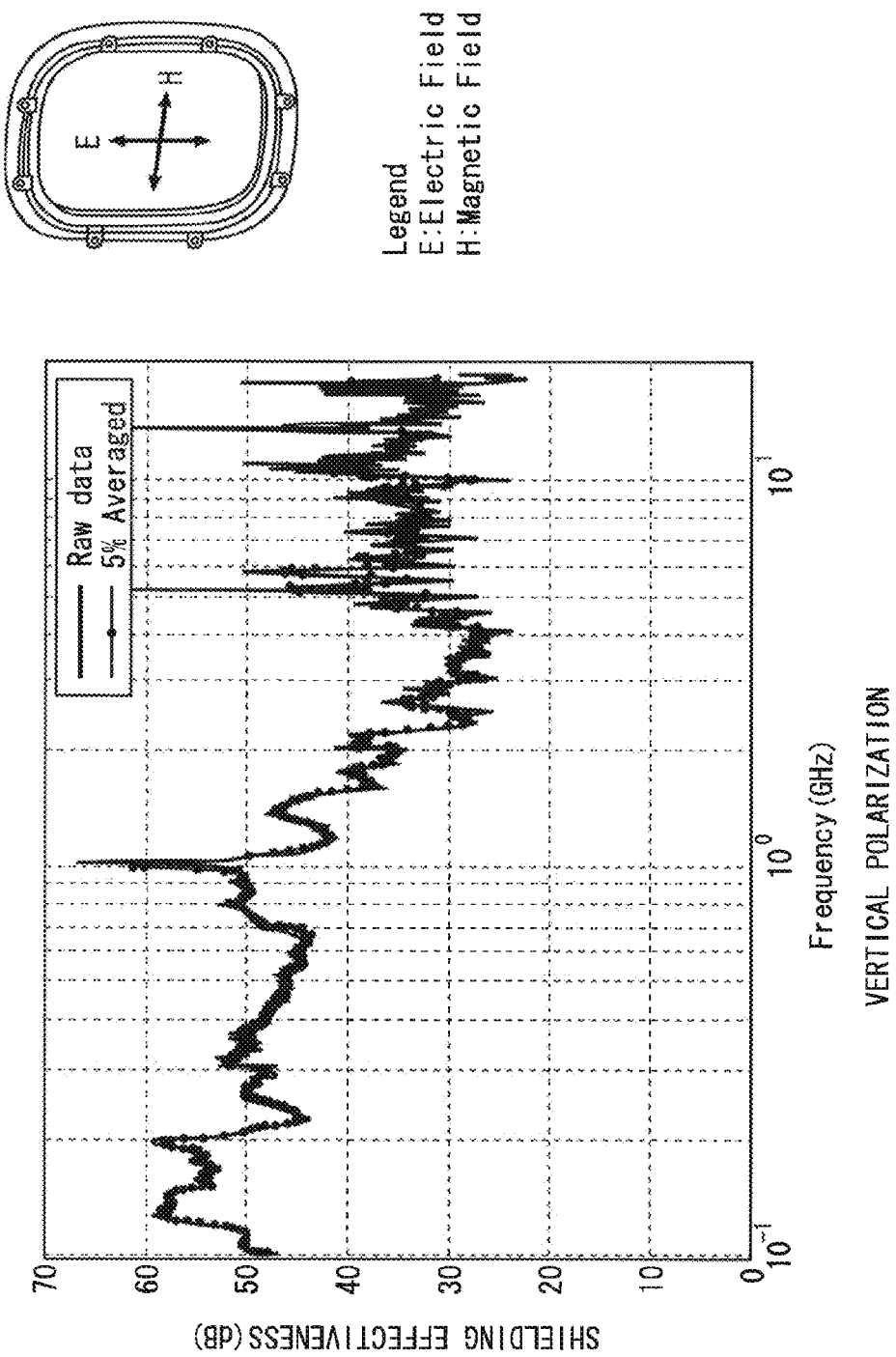

As a result, as shown in FIGS. 10A and 10B, an attenuation effect of at least 20 dB or more against electromagnetic waves was obtained over the entire frequency bands from 100 MHz to 18 GHz in measurements of both of a horizontally polarized wave and a vertically polarized wave with respect to the window.

Note that the structure as described above can be changed as appropriate without departing from the gist of the present invention. A modification example is now described below. Here, in the modification example below, a structure common to the structure described above is provided with the same reference signs, and its description is omitted.

First, the above-mentioned structures are explained by exemplifying the cabin window 20; however, those structures may also be applied to door windows provided on doors of an aircraft and windows formed on a cockpit and side faces of the cockpit. Moreover, the present invention is also applicable to cases in which pressure seals and gaskets of openings such as doors, escape hatches or the like are made electrically conductive.

Figure 11:
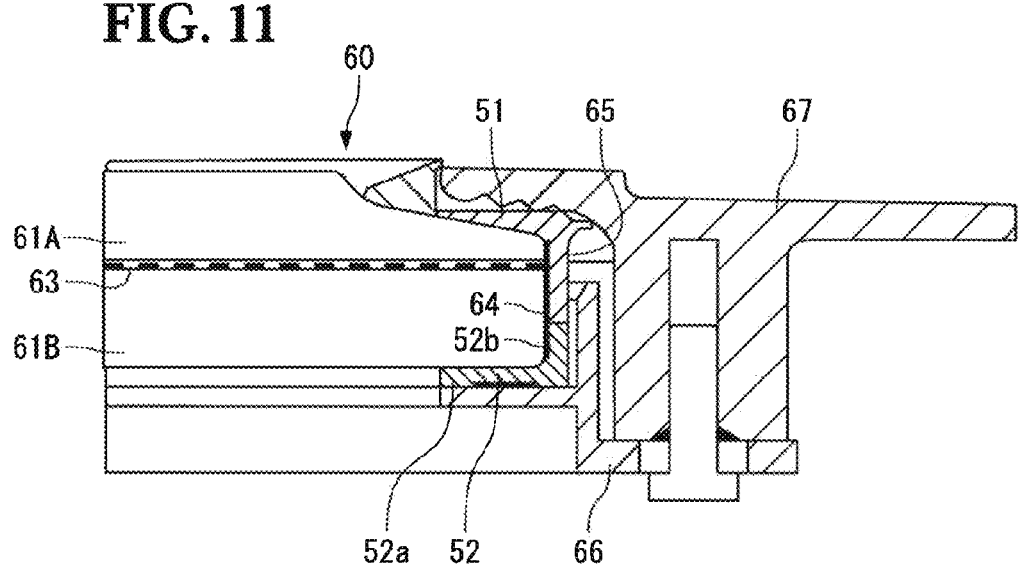
FIG. 11, which shows another example of the present embodiment, is a cross-sectional view illustrating an example in which the present invention is applied to a door window.

FIG. 11 is a view that illustrates a structure in which the present invention is applied to a door window (window, closing member body) 60. As shown in FIG. 11, in the door window 60, the aforementioned electromagnetic shield mesh is held between window panels (closing member panels) 61A and 61B. This structure is substantially the same as the cabin window 20 shown in FIG. 2A. With this structure, a gasket seal 65 is electrically connected to a conductive paint 64 so as to be further connected to an end of an electromagnetic shield mesh (electromagnetic shield film) 63 through the conductive paint 64, and the gasket seal 65 includes a first seal part 51 made of a conductive rubber material having a low volume resistivity and a second seal part 52 made of a conductive rubber material having a volume resistivity that is higher than that of the first seal part 51. Thus, the gasket seal 65 is electrically grounded to a window frame 67 through a window retainer 66 along the entire perimeter thereof.

In the above-mentioned structures, each of the first seal part 51 and the second seal part 52 is formed into an integral structure with intermolecular bonding by using a thermosetting curing process; however, not limited to this, these may be formed by using a two-color injection molding process.

Moreover, in the above-mentioned structures, the window panels 23A and 23B are made of a stretched acrylic material; however, these may be made of a polycarbonate resin or glass.

Furthermore, not limited to the application for aircrafts, the present invention may be applicable in the same manner to any case in which an attempt is made to prepare an electromagnetic shielding configuration in a closing member for use in closing an opening, and the application thereof is not intended to be limited. For example, other applications include windows and sunroofs of automobiles, monitors for electronic apparatuses, lens protection filters for various cameras, and the like.

Besides, the structure described in the above embodiment can be selected or can be changed as appropriate to another structure without departing from the gist of the present invention.

What is claimed is:

1. A window of an aircraft attached to an opening formed in an airframe of the aircraft, comprising:
    a window body;
    a window frame that is made of a conductive material and surrounds an outer perimeter part of the window body;
    a gasket seal that is made of a conductive rubber material, at least a portion of the gasket seal being held between the outer perimeter part of the window body and the window frame; and
    a fixing member that is made of a conductive material and secures the window body to the airframe with the gasket seal and the window frame interposed between the fixing member and the airframe,
    wherein the window body comprises a window panel having light transmissibility, and an electromagnetic shield film that is made of a conductive material and laminated on the window panel,
    a conductive paint is applied to an outer perimeter edge face of the window body,
    the fixing member has a first bonding surface in direct contact with the gasket seal,
    a conductive film is formed on the first bonding surface of the fixing member, and
    an electrical path is formed through the electromagnetic shield film, the conductive paint, the gasket seal, the fixing member, and the window frame.

2. The window according to claim 1,
    wherein the fixing member is made of an aluminum alloy, and
    the conductive film is a chemical conversion coating film.

3. The window according to claim 2,
wherein the chemical conversion coating film is a chromate film.

4. The window according to claim 1,
wherein the fixing member includes a clamp, and
the first bonding surface is formed on a first end of the clamp.

5. The window according to claim 4,
wherein the clamp has a crank shape.

6. The window according to claim 4,
wherein the fixing member further includes a second member having a different shape from the clamp, and
a second bonding surface in direct contact with the second member is formed on a second end of the clamp.

7. The window according to claim 6,
wherein the second member is a clip having an L-shaped cross section.

8. The window according to claim 6,
wherein a conductive film is formed on the second bonding surface of the clamp.

9. The window according to claim 6,
wherein the second member has a third bonding surface in direct contact with the second bonding surface of the clamp, and
a conductive film is formed on the third bonding surface.

10. The window according to claim 6,
wherein one end of the second member is secured to the window frame.

11. The window according to claim 10,
wherein the second member is secured to the window frame by a conductive rivet.

12. The window according to claim 1,
wherein the window frame comprises a plate part that faces a skin of the airframe, and
the window frame is fastened to the skin by a fastener that penetrates through the skin and the plate part.

13. The window according to claim 12,
wherein the fastener comprises a bolt made of metal, and
the bolt has a conductive coating on a surface of the bolt.

14. The window according to claim 13,
wherein an electrical path is formed through the electromagnetic shield film, the conductive paint, the gasket seal, the fixing member, the window frame, the fastener, and the airframe.

15. The window according to claim 1,
wherein the electromagnetic shield film is an electromagnetic shield mesh composed of plated polyester fibers.

16. The window according to claim 1,
wherein the electromagnetic shield film is held between the two window panels.

17. The window according to claim 1,
wherein an electrical bonding resistance of the first bonding surface is smaller than 2.5 mΩ.

18. The window according to claim 6,
wherein an electrical bonding resistance of the second bonding surface is smaller than 2.5 mΩ.

19. The window according to claim 1,
wherein the airframe, the window frame, and the fixing member are made of an aluminum alloy.

20. An aircraft comprising the window according to claim 1.

* * * * *